(12) United States Patent
Calvignac et al.

(10) Patent No.: US 7,089,555 B2
(45) Date of Patent: Aug. 8, 2006

(54) ORDERED SEMAPHORE MANAGEMENT SUBSYSTEM

(75) Inventors: Jean Louis Calvignac, Cary, NC (US); Gordon Taylor Davis, Chapel Hill, NC (US); Marco Heddes, Lawrence, MA (US); Steven Kenneth Jenkins, Raleigh, NC (US); Ross Boyd Leavens, Cary, NC (US); Robert Brian Likovich, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 661 days.

(21) Appl. No.: 10/179,100

(22) Filed: Jun. 25, 2002

(65) Prior Publication Data

US 2003/0002440 A1    Jan. 2, 2003

Related U.S. Application Data

(60) Provisional application No. 60/301,598, filed on Jun. 27, 2001.

(51) Int. Cl.
*G06F 9/46*    (2006.01)
*G06F 12/00*    (2006.01)

(52) U.S. Cl. .................. 718/100; 718/104; 710/200

(58) Field of Classification Search ........ 718/100–104; 710/200
See application file for complete search history.

(56) References Cited

U.S. PATENT DOCUMENTS

| | | | |
|---|---|---|---|
| 4,316,245 A * | 2/1982 | Luu et al. .................... 718/106 |
| 4,805,106 A | 2/1989 | Pfeifer ....................... 364/200 |
| 4,907,228 A | 3/1990 | Bruckert et al. ........... 371/68.3 |
| 5,142,632 A | 8/1992 | Tychon et al. .............. 395/375 |
| 5,159,686 A | 10/1992 | Chastain et al. ............ 395/650 |
| 5,233,701 A | 8/1993 | Nakata ........................ 395/425 |
| 5,261,106 A | 11/1993 | Lentz et al. ................. 395/725 |
| 5,276,886 A | 1/1994 | Dror ........................... 395/725 |
| 5,339,443 A | 8/1994 | Lockwood .................. 395/725 |
| 5,485,593 A | 1/1996 | Baker .................... 395/200.08 |
| 5,548,780 A | 8/1996 | Krein ......................... 395/825 |
| 5,613,139 A | 3/1997 | Brady ......................... 395/800 |

(Continued)

FOREIGN PATENT DOCUMENTS

EP    0953903 A2    11/1999

(Continued)

OTHER PUBLICATIONS

IBM Technical Disclosure Bulletin vol. 30, No. 3, Aug. 1987, p. 1203, "Non-Atomic (Ordered) Semaphore Operations".

(Continued)

*Primary Examiner*—Meng-Al T. An
*Assistant Examiner*—Syed J Ali
(74) *Attorney, Agent, or Firm*—Joscelyn G. Cockburn

(57) ABSTRACT

An ordered semaphore management subsystem and method for use in an application system which includes a plurality of processors competing for shared resources each of which is controlled by a unique semaphore. The subsystem generates an ordered semaphore field (OSF) corresponding to each processor in a linked list of processors and assigns one of four statuses to the OSF depending on the position the processor occupies in the linked list of processors competing for the shared resources. The four states are (1) semaphore head (SH); (2) behind semaphore head (BSH); (3) semaphore head behind (SHB); and (4) skip (Skip). Only the SH processor is allocated the semaphore when requested. A processor not in the SH state will be denied the semaphore even if is available to assure sequential access.

23 Claims, 13 Drawing Sheets

U.S. PATENT DOCUMENTS

| | | | |
|---|---|---|---|
| 5,664,092 A | 9/1997 | Waites | 395/183.01 |
| 5,675,829 A | 10/1997 | Oskouy et al. | 395/826 |
| 5,696,939 A | 12/1997 | Iacobovici et al. | 395/477 |
| 5,734,909 A | 3/1998 | Bennett | 395/726 |
| 5,842,018 A | 11/1998 | Atkinson et al. | 395/700 |
| 5,852,731 A | 12/1998 | Wang et al. | 395/670 |
| 5,862,180 A | 1/1999 | Heinz | 375/244 |
| 5,864,653 A | 1/1999 | Tavallaci et al. | 315/181 |
| 5,893,157 A | 4/1999 | Greenspan et al. | 711/150 |
| 5,901,308 A | 5/1999 | Cohn et al. | 395/591 |
| 6,018,785 A | 1/2000 | Wenniger | 710/200 |
| 6,026,427 A | 2/2000 | Nishihara et al. | 709/106 |
| 6,029,190 A | 2/2000 | Oliver | 709/107 |
| 6,070,254 A | 5/2000 | Pratt et al. | 714/43 |
| 6,079,013 A | 6/2000 | Webb et al. | 712/227 |
| 6,105,085 A | 8/2000 | Farley | 710/41 |
| 6,108,756 A * | 8/2000 | Miller et al. | 711/148 |
| 6,119,246 A | 9/2000 | McLaughlin et al. | 714/27 |
| 6,122,713 A | 9/2000 | Huang et al. | 711/147 |
| 6,125,401 A | 9/2000 | Huras et al. | 709/300 |
| 6,128,706 A | 10/2000 | Bryg et al. | 711/141 |
| 6,131,094 A | 10/2000 | Gord | 707/8 |
| 6,134,579 A | 10/2000 | Tavallaei et al. | 709/100 |
| 6,134,619 A | 10/2000 | Futral et al. | 710/112 |
| 6,154,847 A | 11/2000 | Schofield et al. | 714/4 |
| 6,161,169 A | 12/2000 | Cheng | 711/150 |
| 6,173,313 B1 | 1/2001 | Klots et al. | 709/203 |
| 6,182,108 B1 | 1/2001 | Williams et al. | 709/102 |
| 6,199,094 B1 | 3/2001 | Presler-Marshall | 709/104 |
| 6,594,736 B1 * | 7/2003 | Parks | 711/151 |
| 6,839,811 B1 * | 1/2005 | Fujiyama | 711/141 |

FOREIGN PATENT DOCUMENTS

| | | |
|---|---|---|
| EP | 1033654 A1 | 9/2000 |
| JP | 4361340 | 12/1992 |
| JP | 8329019 | 12/1996 |
| JP | 9044376 | 2/1997 |
| JP | 9231123 | 2/1999 |
| JP | 11039176 | 2/1999 |
| JP | 11272480 | 10/1999 |
| JP | 2001005694 | 1/2001 |
| JP | 2001022720 | 1/2001 |
| WO | WO9603697 | 2/1996 |

OTHER PUBLICATIONS

Research Disclosure, Aug. 2000, p. 1442, article 436131, "User lever writing to a pinned kernel buffer in an SMP system".

IBM Technical Disclosure Bulletin vol. 37, No. 12, Dec. 1994, "Error Handler Installation Procedure", pp. 239-240.

IBM Technical Disclosure Bulletin vol. 37, No. 06A, Jun. 1994, "Shared Memory Cluster—A Scalable Multiprocessor Design", pp. 503-507.

IBM Technical Disclosure Bulletin vol. 30, No. 5, Oct. 1987, "Fast Method for Simultaneous Exclusive Table Modifications", pp. 348-350.

IBM Technical Disclosure Bulletin vol. 38 No. 4, Apr. 1995, "Hardware Contention Serialization Algorithm", pp. 73-77.

IBM Technical Disclosure Bulletin vol. 33, No. 4, Sep. 1990, "Store Purge Pipeline for Mid-Range Processor", pp. 299-301.

IBM Technical Disclosure Bulletin vol. 36, No. 6A, Jun. 1993, "Emulator DosExit Processing for Reporting Errors", pp. 255-256.

Research Disclosure No. 317, Sep. 1990, "Improved Error Detection Using MP Fields".

IBM Technical Disclosure Bulletin No. 9. Feb. 1991, "System Support for Multiprocessing Without an Atomic Storage", pp. 18-23.

E. Chang, "N-Philosophers: an Exercise in Distributed Control", Computer Networks vol. 4, No. 2,, Apr. 1980, pp. 71-76.

P. Bohannon et al., "Recoverable User-Level Mutual Exclusion", Proceedings, 7th IEEE Symposium on Parallel and Distributed Processing (Cat. No. 95TB8131), 1995, pp. 293-301.

J. Thornley et al., "Monotonic counters: a New Mechanism for Thread Synchronization", Proceedings 14th International Parallel and Distributed Processing Symposium, IPDPS 2000, pp. 573-582.

K. C. Tai et al., "VP: A New Operation for Semaphores", Operating Systems Review, vol. 30, No. 3, Jul. 1996, pp. 5-11.

Mei Chen Chia et al., "A Resource Synchronization Protocol for Multiprocessor Real-Time Systems", Proceedings of the 1994 International Conference on Parallel Processing, Pt. vol. 3, 1994, pp. 159-162.

Heng Liao et al., "Hardware Support for Process Synchronization Algorithms", Mini-Micro Systems, vol. 16, No. 9, Sep. 1995, pp. 7-13.

Chung Wu Chaio et al., "The Design and Implementation of a Distributed Semaphore Facility: DISEM", Proceedings of the National Science Council, Republic of China, Part A, vol. 19, No. 4, Jul. 1995, pp. 319-320.

D. Scholefield, "Proving Properties of Real-Time Semaphores", Science of Computer Programming, vol. 24, No. 2, Apr. 1995, pp. 159-181.

D. Weiss, "Shared Bus Semaphore Detector Proposal", Motorola Technical Developments, vol. 3, Mar. 1983, pp. 74-78.

J. Milde et al., "Realization of Synchronization Tools and their Efficiency in the Multiprocessor System M5PS", 10th IMACS World Congress on System Simulation and Scientific Computation, vol. 1, 1982, pp. 333-335.

N. Wait, "VME—a Microcomputer Bus for Europe", New Electronics vol. 15, No. 16,Aug. 17, 1992, pp. 57-58.

N. Marovac, "Interprocess Synchronization and Communication in Distributed Architectures", 3rd InternaTional Conf. On Computer Science) Chile, 1983 pp. 1-16.

N. Marovac, "On Interprocess Interaction in Distributed Architectures", Computer Architecture News vol. 11, No. 4, Sep. 1983, pp. 17-22.

T. Balph, "Interprocessor Communication in a Tightly coupled Multiple Processor Architecture", Second Annual Phoenix Conference on Computers and Communications, 1983 Conf. Proceedings pp. 21-25.

* cited by examiner

ORDERED SEMAPHORE MANAGEMENT SUBSYSTEM

This application claims the benefit of the filing date of provisional application Ser. No. 60/301,598, filed Jun. 27, 2001.

FIELD OF THE INVENTION

The invention relates to semaphore management subsystems and more particularly to generic ordered semaphore management subsystems and a method for managing ordered semaphores suitable for use with any multi-threaded (multi-processor) system requiring in part or in hole in line or sequential processing of a task divided and distributed among a plurality of threads or processors for later recombination.

BACKGROUND

While the invention is generic in nature and capable of use with a large variety of multi-threaded processor systems, it will be described in conjunction with a multi-threaded processor system such as the IBM Part No. IBM32NPR161EPXCAE133 Network Processor which employs a plurality of processors or threads each of which concurrently process data frames which may be from the same or different data flows. The individual threads/processors share common resources in the network processor. Semaphores defined to be associated with specific resources are used to allocate the specific resources to the individual threads as requested.

Within such a network processor several data frames are processed at the same time. Each data frame is processed by one processor/thread. Each processor/thread operates independently from all the other processors/threads. Thus, as the software (picocode) processes a data frame, the software has no knowledge of other frames which have been, are being, or will be processed. As data frames are processed, a thread may need access to a shared resource. This shared resource is shared among all threads. To allow a thread access to the resource without interference from other threads, semaphores are used. A semaphore is a mechanism which allows a processor/thread to use a resource without interference from another processor/thread. Semaphores exist in almost every multi-processor environment where multiple processors can access common resources. A semaphore is used to ensure that one and only one processor/thread has "ownership" or use of a given resource at any given time.

A network processor is a multi-processor environment with resources which can be accessed by all processors/threads. Thus, semaphores are an intricate part of network processors. As discussed above, network processors process data frames which belong to one or more data flows. Traditionally, semaphores are implemented in software using "read modify write" or "test and set" instructions. When these instructions are used as a basis to create and allocate semaphores, valuable system resources must be used. To implement a semaphore, system memory must be used. To access a semaphore, several lines of code must be executed. If these system resources were not used for semaphore implementation, they could be used for other functions or provide a performance increase by not executing extra line(s) of code.

When semaphores are implemented in software, several lines of code must be executed to access and lock the semaphore, impacting performance. If the semaphore is unavailable (locked by another thread/processor), the software would need to poll on the semaphore. This would waste valuable bandwidth on the arbitrated memory holding semaphore locks to be accessed by all threads/processors. To implement a fair semaphore access in software requires more system memory and lines of code. For example, if a semaphore is locked, the thread/processor would need to put itself in a queue waiting for access. This queue would be implemented in system memory and require software management impacting performance. This allows threads/processors to have fair access to resources.

In a software semaphore environment, multiple threads/processors cannot unlock their respective semaphores at the same time. Typically, all the semaphores are in the same system memory. Each thread/processor must arbitrate to access the memory to unlock their semaphore. This may add to the processing time of other threads/processors waiting to access the same memory to access the semaphore locks. The same is true for locking semaphores. When semaphores are implemented in software, only one semaphore can be unlocked/locked at a time since all the semaphores reside in a common area of system memory.

In the IBM Network Processor System identified above a device termed Completion Unit monitors the order in which frames or packets in a flow are processed by the threads or Dyadic Protocol Processor Units (DPPUs) and generates information used by a semaphore sub-system to control the order in which semaphores are assigned. Such systems require ordered semaphores which must perform two functions. First, the well known semaphore function, ensure that one and only one processor/thread has access to a single resource at any time. And second, ordered semaphores must ensure that the processors/threads which are processing data frames of the same data flow access the common resource in frame order, for example, an e-mail message which must be encrypted using an encryption co-processor shared among all of the processors/threads. The encryption of the data frames must occur in order to properly encrypt the message. The software would use an ordered semaphore mechanism to access the encryption co-processor.

This would ensure two things. First, only one processor/thread accesses the co-processor at a time. And second, the encryption of the data frames of the data flow (e-mail message) occurs in order. Ordered Semaphores are needed since processing time for each data frame can be different. Data frames from the same data flow will take different amounts of time to process. For example, tree searches for each data frame can take different amounts of time. Threads which share a common ALU will stall occasionally to allow the other thread to process data. Thus, frames in the same data flow being processed by different threads will attempt to access a shared resource at different times and not in data flow order. Because of this, ordered semaphores are required to ensure the shared resource is accessed in data flow order.

The Completion Unit logic block contains all the information required to put processed data frames (received from processors/threads) back in the correct order for each data flow. USPTO applications Ser. No. 09/479,028 filed Jan. 7, 2000, now issued as U.S. Pat. No. 6,633,920 and Ser. No. 09/548,906 filed Apr. 13, 2000, now issued as U.S. Pat. No. 6,977,928 incorporated herein by reference describe how the Completion Unit performs this function. Within the completion unit, linked lists of the data frames assigned to processors/threads represent the data frame order of the data flows. One linked list exists for each data flow which currently has a data frame being processed by a processor/thread. The head of the linked list is associated with a processor/thread.

It is from this processor/thread that the next processed data frame is to be taken from and sent out onto the network. When the processed data frame is sent, the head of the linked list is removed and the next element of the linked list is examined; see the referenced applications for details.

SUMMARY OF THE INVENTION

The invention contemplates an ordered semaphore management subsystem and method for use in an application system which includes a plurality of shared resources each of which is controlled by a unique semaphore; a plurality of processors adapted to perform similar tasks using one or more shared resources controlled in a sequential manner by the semaphores on assigned segments of a continuous data stream; a linked list of processor labels each identifying a processor and defining the order in which the processed data is to be assembled. Each label includes, a data flow ID, a data flow head field, a data flow tail field, and a pointer field pointing to the next label in the linked list.

The subsystem includes a logic circuit responsive to the creation of a label included in the linked list for generating and encoding a predetermined state in an ordered semaphore field (OSF) corresponding to the created label. The states include:

a semaphore head (SH) state, a behind semaphore head (BSH) state, a semaphore head behind (SHB) state and, a skip (Skip) state.

A second logic circuit responsive to a request for a semaphore from a processor examines the encoded ordered semaphore field corresponding to the processor's label and grants the semaphore request when the field is in the SH state. A third logic circuit responsive to a change in the status of a processor updates the ordered semaphore field corresponding to the label associated with the processor. It updates the OSF corresponding to the label identified by the pointer in the label of the processor whose status changed.

DETAILED DESCRIPTION OF THE INVENTION

Figure 1:
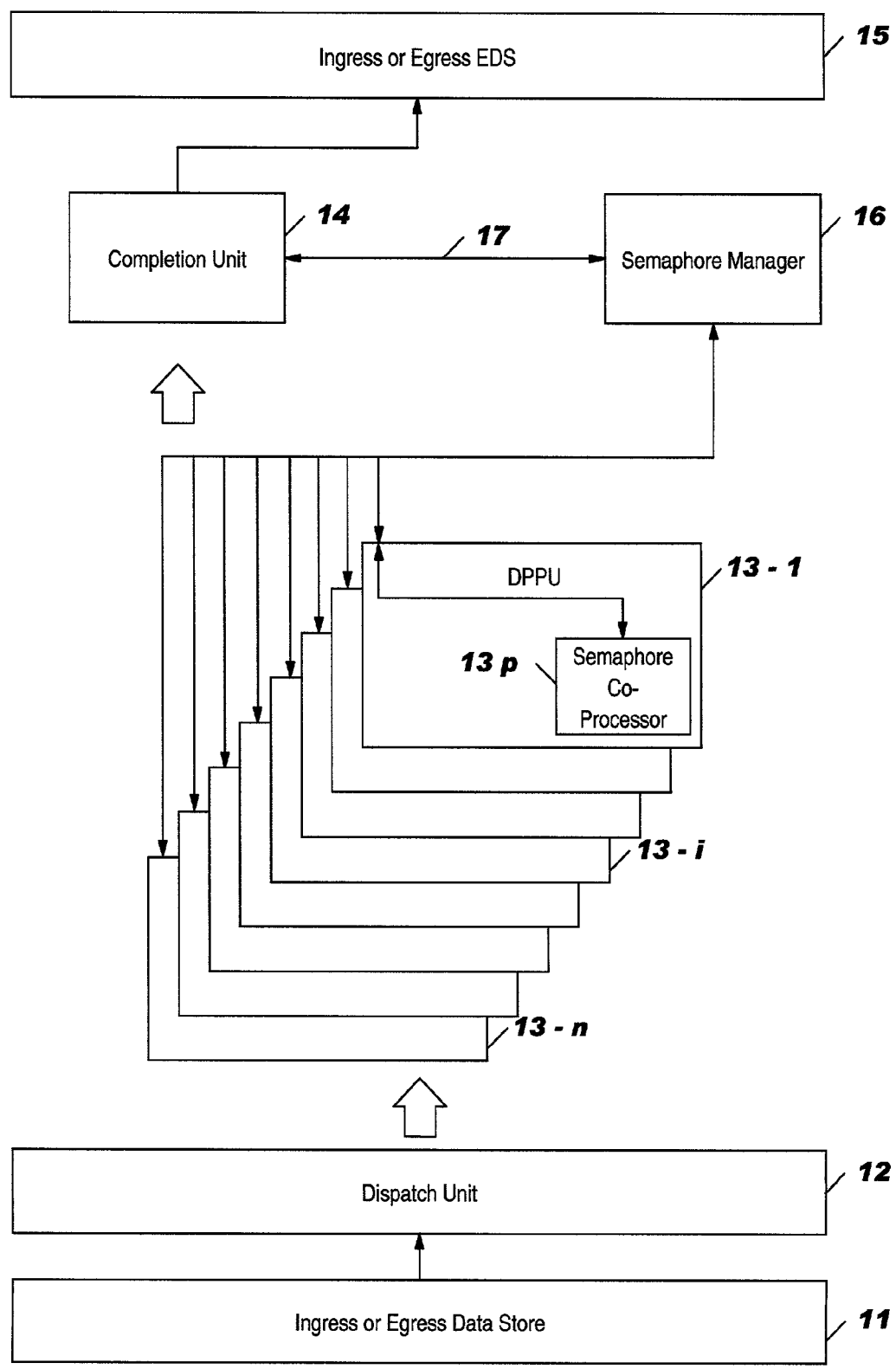
FIG. 1 is a block diagram of an application system which incorporates a semaphore manager subsystem according to the invention.

As pointed out above the completion unit of the IBM network processor system contains all the information required to put processed data frames (received from processors/threads) back in the correct order for each data flow. By adding a two bit Ordered Semaphore Field (OSF) to each element in the linked lists of the completion unit, ordered semaphore management can be achieved. The OSF allows the Semaphore Manager/Co-processor logic block to walk the linked list(s) within the completion unit before the processed data frames are sent out onto the network. The lists can reside in the completion unit or alternatively updated copies of the lists can be provided by the completion unit to the semaphore manager subsystem.

The OSF added to the linked list elements represent one of four states: (1) this element is currently the Semaphore Head (SH), (2) this element is currently behind the Semaphore Head (BSH), (3) the SH is currently behind this element (SHB), and (4) this element has been removed from the linked list (Skip), with respect only to ordered semaphores.

When a new element (label/thread number) is loaded into the completion unit (due to a dispatch), the Ordered Semaphore Field (OSF) will be set to one of three states. The OSF can be set to indicate the element has been removed from the linked list (with respect to ordered semaphores). This is used in the case where ordered semaphores are disabled or it is known that the software will not use ordered semaphores to process the dispatched frame. If the label/thread being loaded into the completion unit is linked into an existing linked list behind an existing Semaphore Head (SH) field, the OSF is marked as BSH. If the label/thread being loaded into the completion unit is the start of a new linked list, or is being linked into an existing linked list which does not have a OSF=SH, the OSF is marked SH.

When an element is SH, this allows the Semaphore Manager/Co-processor to grant an ordered semaphore for the thread to access the protected resource. When an element is in the BSH state, the Semaphore Manager/Co-processor must wait to grant the thread access to the ordered semaphore protected resource even if the resource is available. At any time, a thread can indicate to the Semaphore Manager/Co-processor (using the reservation release command) that it no longer needs the ordered semaphore access. If this occurs when the thread is the SH, the two bit field is changed to indicate this element is currently SHB, and the next element which has not been removed from the linked list (with respect to ordered semaphores) is marked as the SH.

If the Semaphore Manager/Co-processor, in response to the reservation release command, indicates that a particular thread no longer needs the ordered semaphore access and the thread is currently BSH, the element will be marked Skip and removed from the linked list with respect to ordered semaphores. When the semaphore head reaches this thread, the semaphore head will simply skip to the next element (thread) in the list. By adding additional Ordered Semaphore Fields, more than one ordered semaphore can be supported per data flow. For example, consider adding two Ordered Semaphore Fields to each element within the completion unit. The software can be designed to access two different resources, or the same resource twice, using Ordered Semaphores. Again, the additional logic to the completion unit interface logic block is minimal if the function is included in the completion unit logic block.

The Semaphore Manager/Co-processor does not add or remove labels/thread numbers from the linked lists within the completion unit. The Semaphore Manager/Co-processor can mark labels/thread numbers as Skip. This allows the thread to continue processing without having to access the ordered semaphore. The "Reservation Release" command of the Semaphore Coprocessor/Manager can mark a label/thread as "Skip". When the thread in front releases the ordered semaphore, the ordered semaphore head will pass to the thread behind the thread marked "Skip". The Semaphore Manager/Co-processor is simply walking the pre-existing linked lists within the completion unit (if they are included in the completion unit logic block) to achieve ordered semaphore operation. The OSF can be used to mark the associated label/thread number as "removed" from the linked list with respect to ordered semaphores by setting the OSF to Skip. The label/thread numbers remain in linked lists to support the enqueue of processed data frames. The "Reservation Release" or "skip" marking is non-blocking on every thread. Thus, threads performing "Reservation Release" commands do not wait to become the head of the ordered semaphore queue before completing the instruction. This increases system performance by reducing processing time.

In FIG. 1a network processor such as the IBM processor identified above includes an input/output data storage unit 11 which stores a plurality or stream of data frames which require processing. A dispatching unit 12 transfers individual data frames to a plurality of processors 13-1–13-n which process the individual frames received from the dispatching unit 12. The processors 13-1–13-n pass the processed data frames on to a completion unit 14 which reassembles the data frames before passing the reassembled stream of data frames on to a second input/output unit 15.

Each of the processors 13-1–13-n includes a semaphore coprocessor 13p which interfaces a hardware semaphore manager subsystem 16 constructed according to the invention. The semaphore subsystem 16 is implemented in hardware and interfaces with, for example, the Dyatic Protocol Processor Unit (DPPU) of the using processing system. Each DPPU contains four threads which can each process one data frame. Each DPPU has one Semaphore Co-Processor associated with it. The threads in a given DPPU interface to the one Semaphore Co-Processor within the DPPU. The multiple Semaphore Co-Processors all communicate with the central Semaphore Manager subsystem. The Semaphore Manager subsystem 16 contains all of the tables and control logic to lock, unlock, and arbitrate for semaphores. The semaphore manager 16 communicates with the completion unit 14 over a bus 17.

Only one processor instruction is executed to lock a semaphore, and only one processor instruction is executed to unlock a semaphore. This saves instruction memory and processing time when compared to software implementations of semaphores. An unlock instruction from a thread executes immediately. Nothing can block unlock instructions within the Semaphore Manager subsystem, including other unlock instructions from other threads. When semaphores are implemented in software, only one semaphore can be unlocked at a time since all the semaphores reside in a common area of system memory.

Fairness algorithms can be implemented in the Hardware Semaphore Manager subsystem. This provides fairness of access to a semaphore when multiple threads/processors request access to the same semaphore. This eliminates the need for software and system memory to be utilized to implement fairness algorithms. This increases performance by reducing frame processing time and instruction memory utilization, and does not use any system memory.

The Hardware Semaphore Manager subsystem contains the semaphores. Each semaphore is an N bit value. For example, each semaphore could be 32 bits. This allow 2^32 resources to be managed by the Semaphore Manager. Since the Semaphore Manager subsystem is generic and designed to be used by a wide variety of systems, it is the responsibility of the using system programmer to attach a meaning to a semaphore. That is, the Semaphore Manager does not know what a Semaphore represents. It is just a string of 32 bits. Semaphores can be seen as having 32-bit address space and the programmer can map this to anything, like the Tree Search Memory, the Data Store, the Embedded PowerPC, etc. There are two advantages here. First, no system memory is used for semaphore management. Second, the Hardware Semaphore Manager implementation is generic with respect to the number of and types of system resources which must be managed by semaphores. As the Network Processor evolves and shared resources are added or removed, the Semaphore Manager does not need to change. The Hardware Semaphore Co-processor and Manager does not use any system memory. This eliminates the need for memory accesses, and allows the memory bandwidth to be used for other functions.

Figure 2:
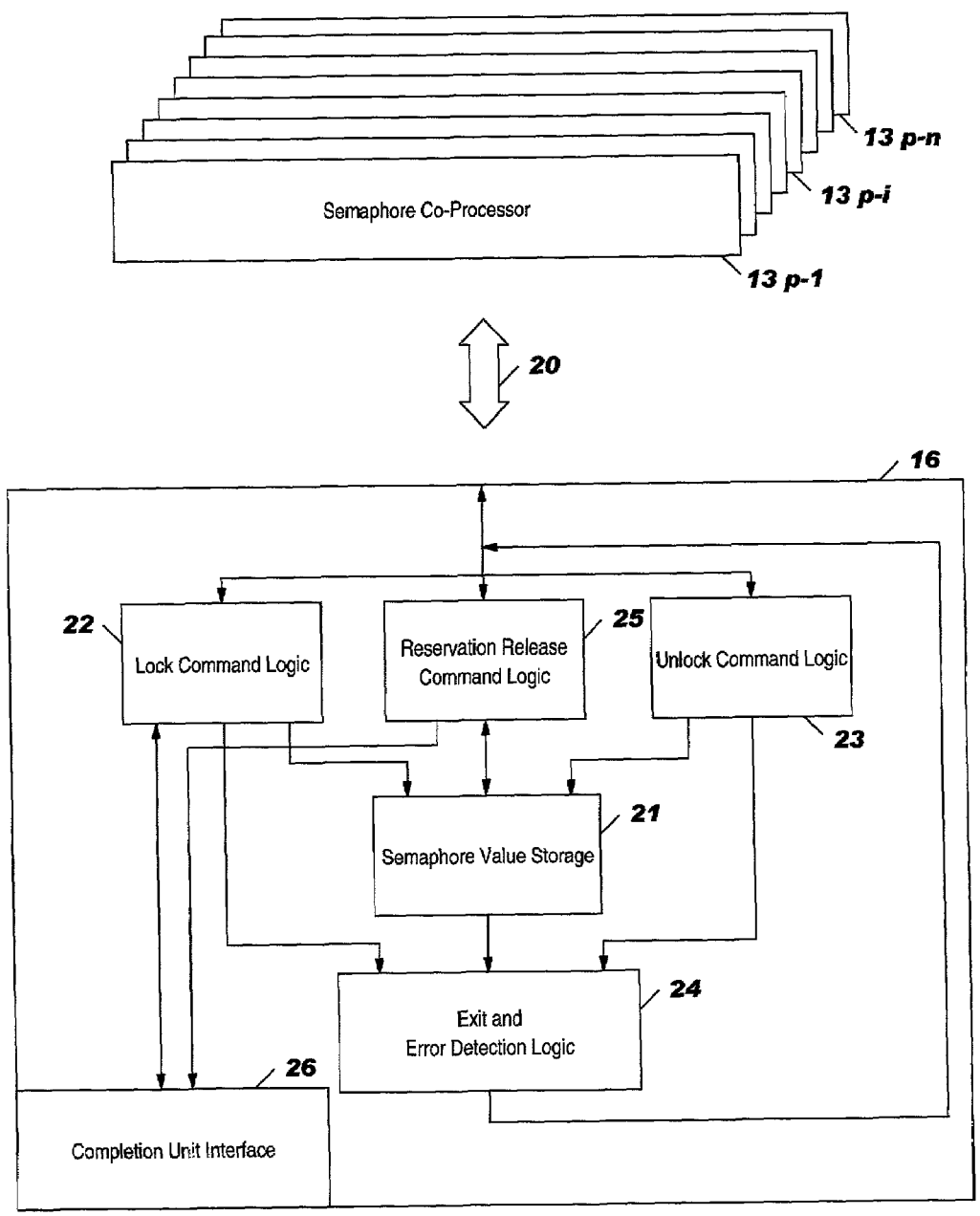
FIG. 2 is a block diagram of a semaphore manager subsystem according to the invention.

In FIG. 2 the semaphore coprocessors 13p-1–13p-n communicate with the Semaphore Manager subsystem 16 via a bus 20. The subsystem 16 includes a semaphore value storage 21 (FIG. 3), semaphore lock command logic 22 (FIGS. 4A and 4B), semaphore unlock command logic 23 (FIG. 5) and semaphore exit and error detection logic 24 (FIG. 6). It also includes reservation release command logic 25 (FIG. 7) and completion unit interface logic 26 (FIGS. 9–12).

Figure 3:
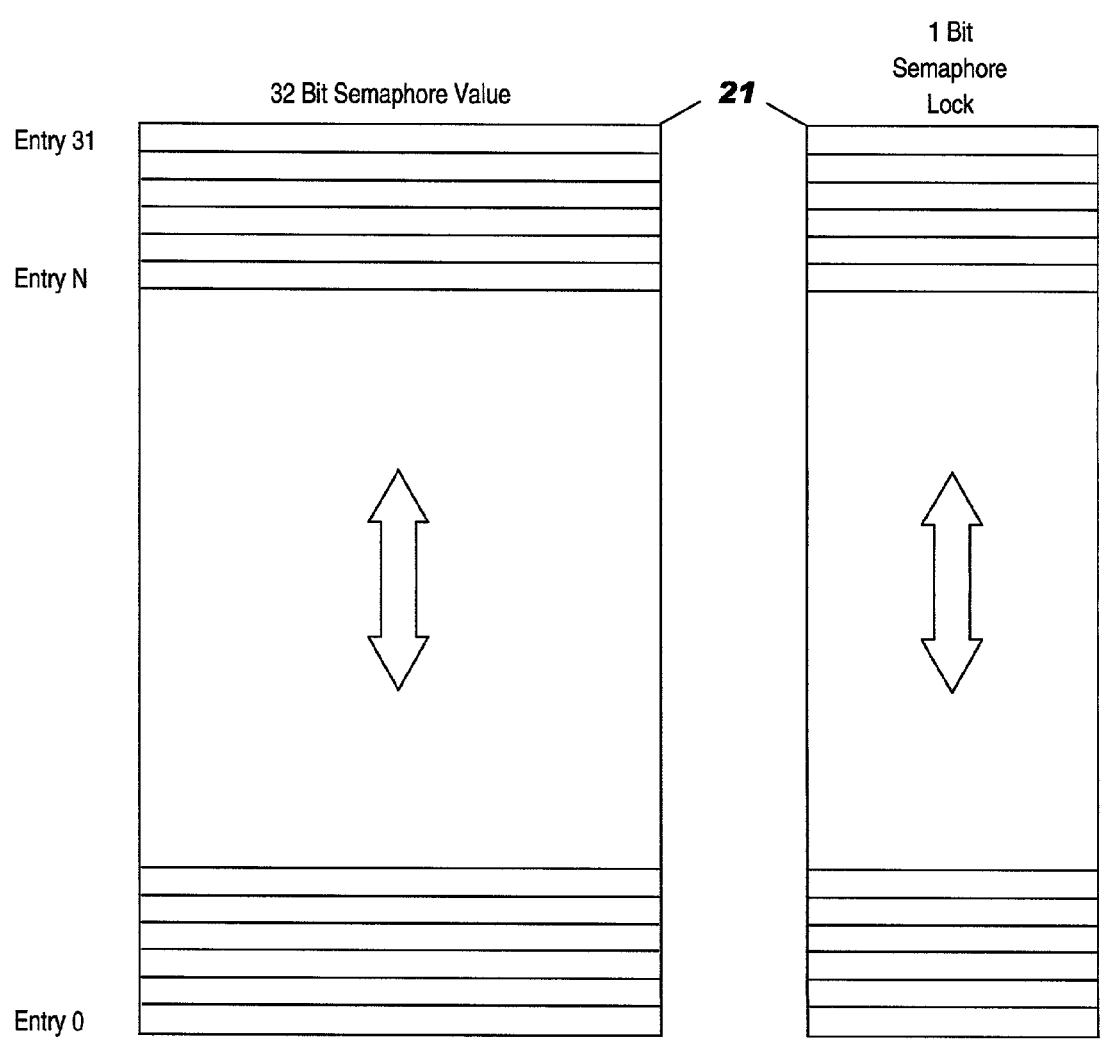
FIG. 3 is a diagram of the semaphore value storage 21 of FIG. 2.

FIG. 3 is a block diagram of the semaphore value storage. The storage can be based upon a RAM, CAM, or discrete latches. For each thread there exists exactly two registers. The first register (Semaphore_Value) is for example a 32 bit register which holds the 32 bit Semaphore Value (Sem_Val) that can be locked by the associated thread. The second register (Semaphore_Lock) is a 1 bit register which indicates if the Sem_Val stored in the associated Semaphore_Value register is locked or unlocked. When the Semaphore_Lock register is set to '1'b, the Sem_Val in the Semaphore_Value register is locked. When the Semaphore_Lock register is reset to '0'b, no Sem_Val is locked by the associated software thread.

A semaphore can be locked when a software thread issues a single command "Semaphore Lock" (Sem_Lock) with two parameters. The first parameter is the "Semaphore Value" (Sem_Val). This is, for example, a 32 bit value which the thread wishes to lock. The second parameter is the "Timeout Enable" (Timeout_Enable) bit. When the Timeout Enable bit is set and the requested semaphore is already locked by a different thread, the Semaphore Lock command will terminate without locking the semaphore.

In the preferred embodiment, each thread has an assigned register in the semaphore value storage and is thus identified as the source of the semaphore value requested. Alternatively, the requested semaphore value could be placed in any available register along with a thread or flow ID.

Figure 4A:
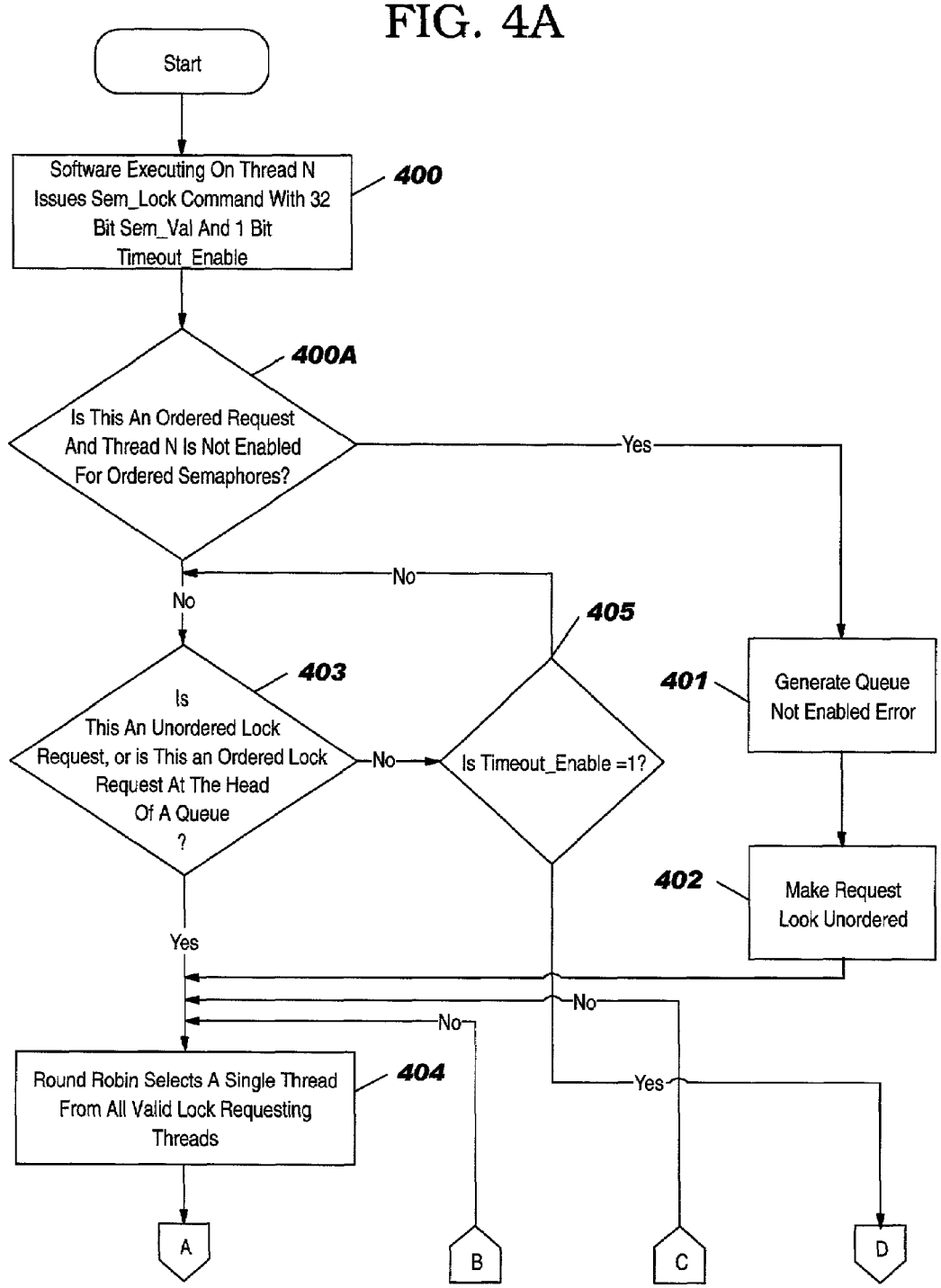
FIGS. 4A and 4B are flow diagrams defining the lock command logic 22 of FIG. 2.
Figure 4B:
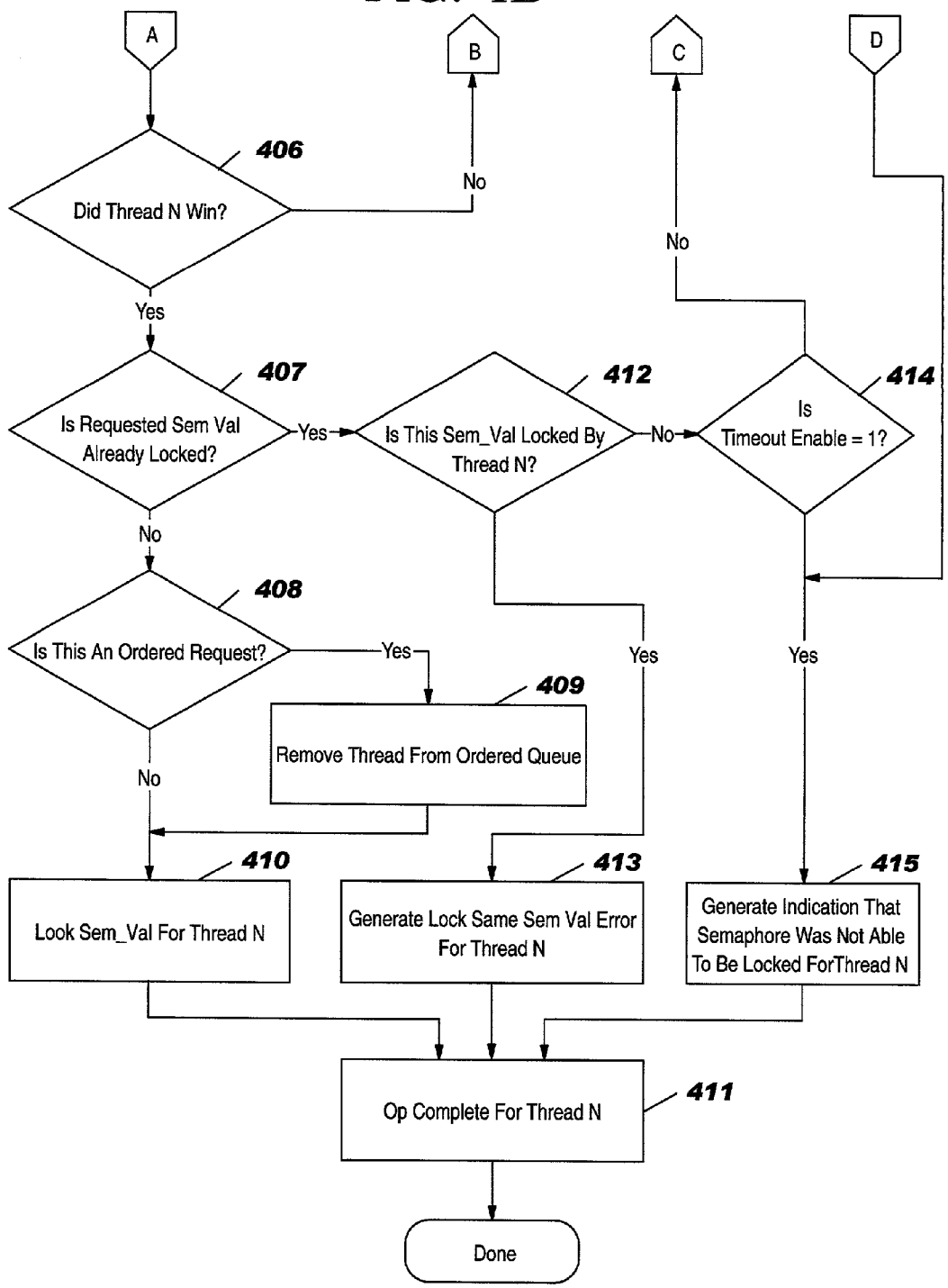

FIGS. 4A and 4B illustrate the function of the lock command logic. Directional blocks A, B, C and D indicate the connections between the two figures. The process starts when a thread N issues a semaphore lock command which includes a 32 bit semaphore value and a 1 bit time out enable value 400. If the request is an ordered semaphore request and thread N is not enabled for ordered semaphores 400-A, a queue not enabled error is generated 401 and the request is changed to an unordered request 402. If it is not the former, it is examined to determine if it is an unordered request or an ordered request at the head of a queue 403. If the request is either of the above it enters a round robin 404 for selection and exits FIG. 4A at A. If the answer in block 403 is "no" (in which case it is an ordered request which is not the head of a queue) it is examined to determine if the timeout enable bit is set. If the timeout enable bit is not set 405 the request loops back to 403. If the bit is set it exits FIG. 4A at D.

The non-winning threads at block 406 loop back to block 404 while the semaphore request from the winning thread is examined 407 in the semaphore value storage to determine if that semaphore value is currently locked. If the semaphore value is not locked it is examined in block 408 to determine if the request is ordered. If the request is ordered, the thread is removed from the ordered queue by sending a Pop signal 409 and the semaphore value requested is locked 410 for thread N. If the request was not ordered the requested semaphore value is locked for thread N 410 and in either case the operation for thread N is complete 411.

If the locked semaphore value requested by thread N is already locked by thread N 412, a lock same semaphore value error for thread N is generated 413 and the operation completes at 411. If the requested semaphore value 412 was not locked by thread N the timeout bit is examined 414 and if it is not set it loops back to 404 via C. If it is set a signal is generated for thread N indicating that the requested semaphore was not available 415 and the operation completes 411.

Figure 5:
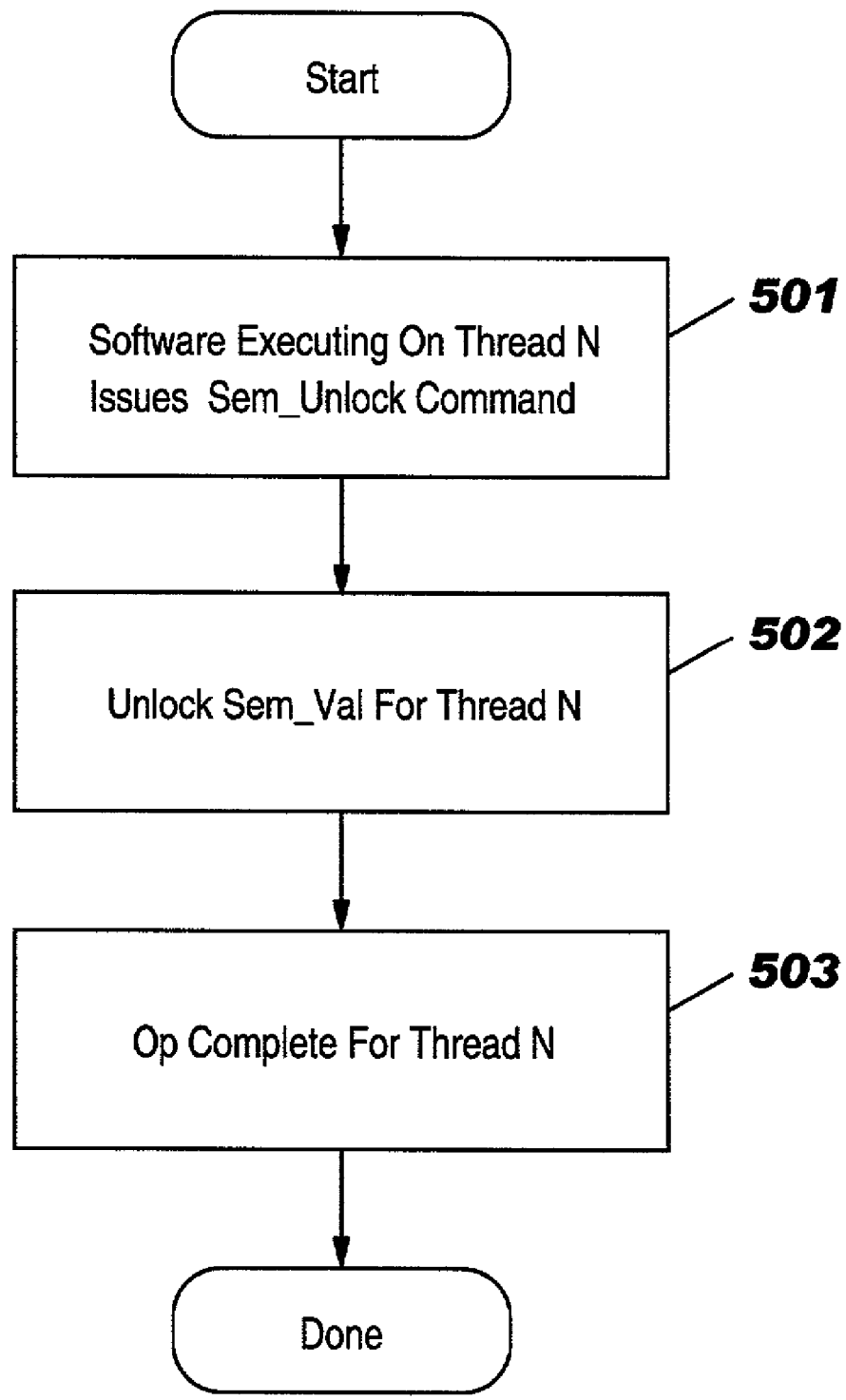
FIG. 5 is a flow diagram defining the semaphore unlock command logic 23 of FIG. 2.
Figure 6:
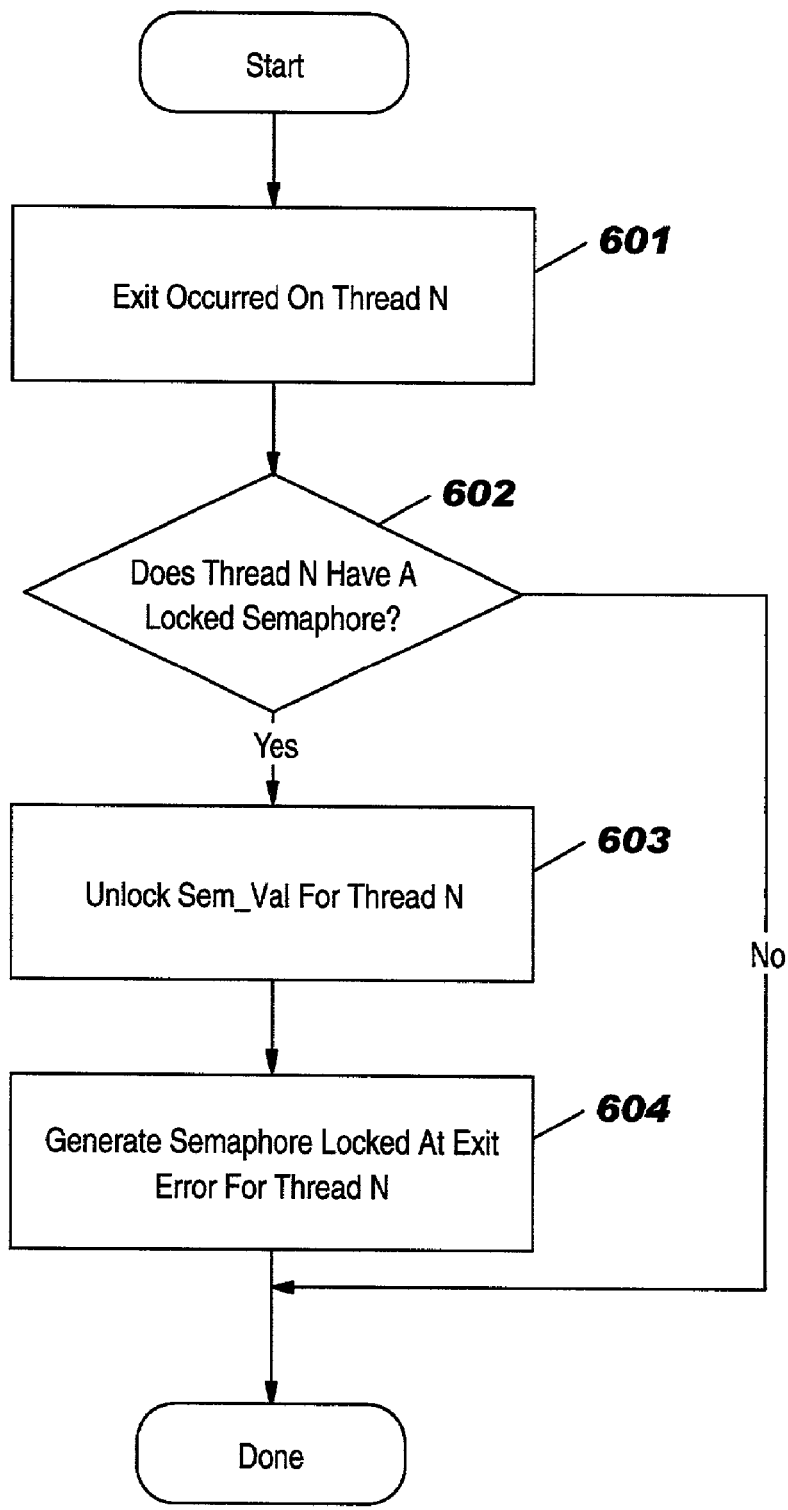
FIG. 6 is a flow diagram defining the error and exit logic 24 of FIG. 2.

When a thread completes an operation with a resource controlled by a semaphore it sends a semaphore unlock command to the semaphore manager, FIG. 5 at 501. The semaphore manager unlocks the semaphore by resetting the semaphore lock bit in the memory location associated with thread N in the semaphore memory 21, 502 and completes the operation for thread N 503.

When thread N exits (processing is complete for the data frame) 601 FIG. 6 the semaphore manager examines the address in memory 21 associated with thread N to determine if the thread has a locked semaphore. If a semaphore is locked 602 the semaphore manager unlocks the semaphore 603 and generates a semaphore locked at exit error for thread N 604. If a semaphore is not locked by thread N the operation is complete.

Figure 7:
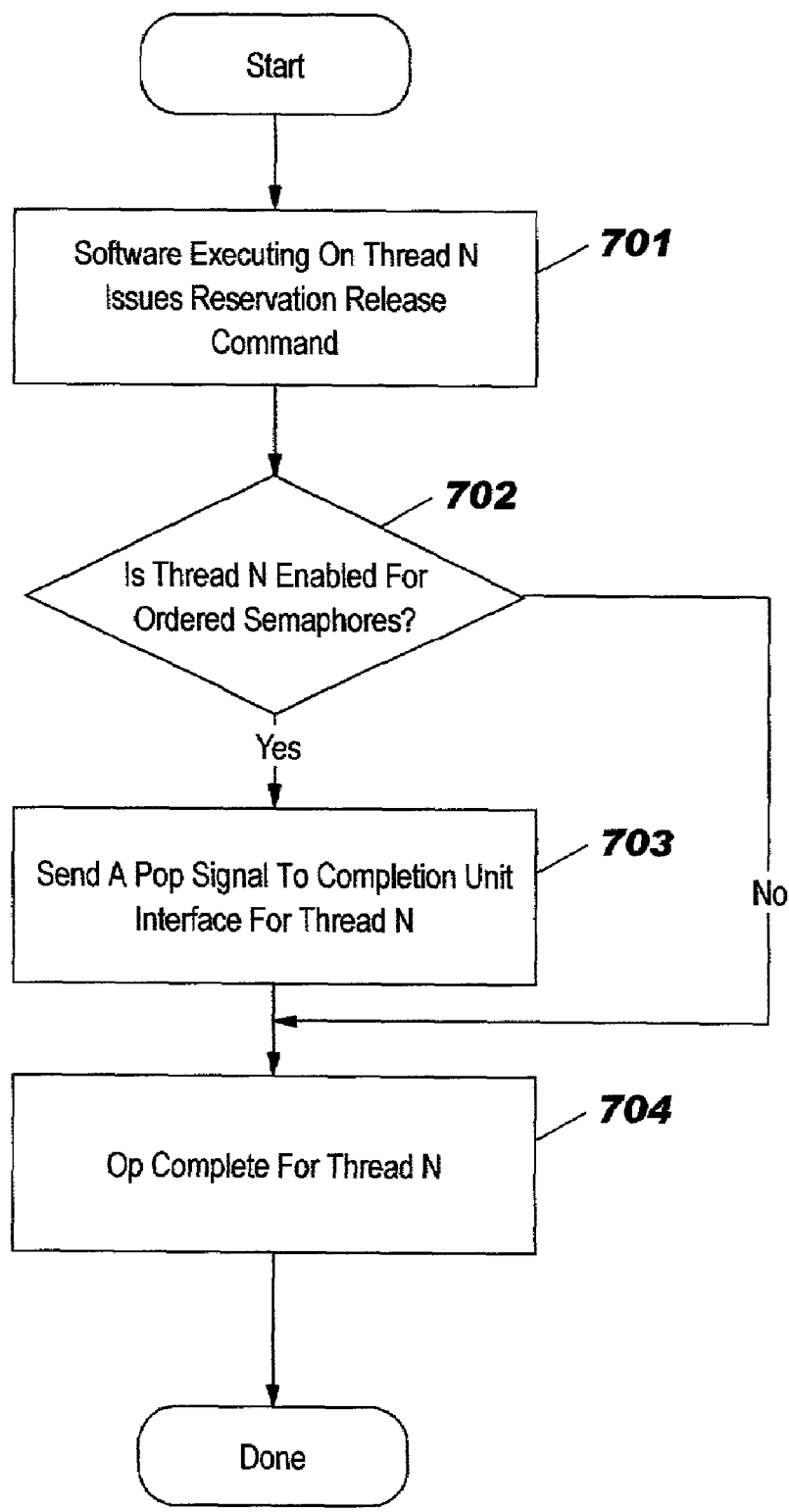
FIG. 7 is a flow diagram the reservation release command logic 25 of FIG. 2.

When the software on thread N issues a reservation release command 701 FIG. 7 the semaphore manager determines if the thread is enabled for ordered semaphores 702. If it is, the semaphore manager sends a Pop signal (this signal indicates an end of ordered semaphore operation for thread N) to the completion unit interface logic 703 and completes the current operation for thread N 704. If thread N is not enabled for ordered semaphores 702 the semaphore manager completes the current operation for thread N 704.

Figure 8:
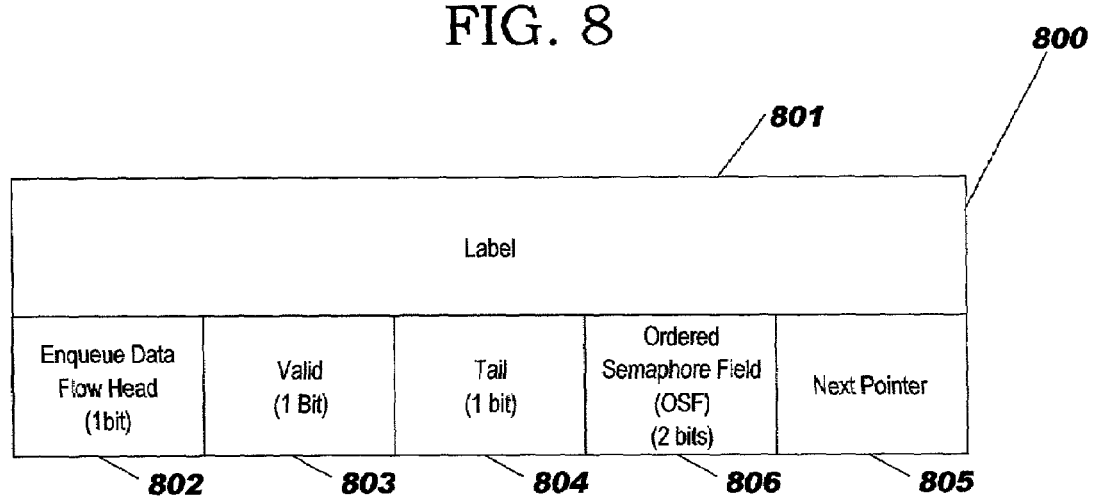
FIG. 8 is a diagram of a linked list thread element including an ordered semaphore field OSF according to the invention; and, FIGS. 9–12 are flow diagrams of the completion unit interface logic.

The completion unit in the referenced IBM network processor employs a linked list(s) of labels for managing the reordering of data frames processed by the different threads. The label illustrated in FIG. 8 is similar (with one exception discussed below) to the label used in the IBM system. The label element 800 illustrated in FIG. 8 contains the label associated with the data flow being processed and a plurality of fields. A one bit field 802 when set indicates that the thread is the head of the enqueued data flow. A one bit field 803 when set indicates that the label is valid. A one bit field 804 when set indicates that the thread is the tail of the data flow and a multi-bit field 805 is a pointer to the next label in the linked list of labels.

Applicants have modified the label of the referenced IBM network management system by adding a two bit ordered semaphore field (OSF) 806 to the label. This field defines one of four states (00, 01, 10 & 11) that a thread enabled for ordered semaphores can assume. A first state SH (which can be occupied by only one thread in a linked list of 800's), indicates that the thread is currently the semaphore head. A second state BSH indicates that the thread is currently behind the semaphore head. A third state, SHB indicates that the SH is currently behind the thread. And the fourth state Skip indicates that the thread has been removed (but only with respect to ordered semaphores) from the linked list. How these states are applied and managed will become apparent from the description of FIGS. 9–12 below.

The semaphore manager needs access to the linked list(s) of labels. In those instances where the application system allows access, the logic necessary to manage the OSF (which is the case with the IBM network system) can be achieved through the completion unit interface logic 26. If access is not available then the application system needs to make updated copies of the linked list(s) available to the interface logic 26. The location of the linked list(s) is not critical to the invention and in the descriptions which follow it will be assumed that the application system allows the semaphore manager access to the linked list(s) via the interface 26.

Figure 9:
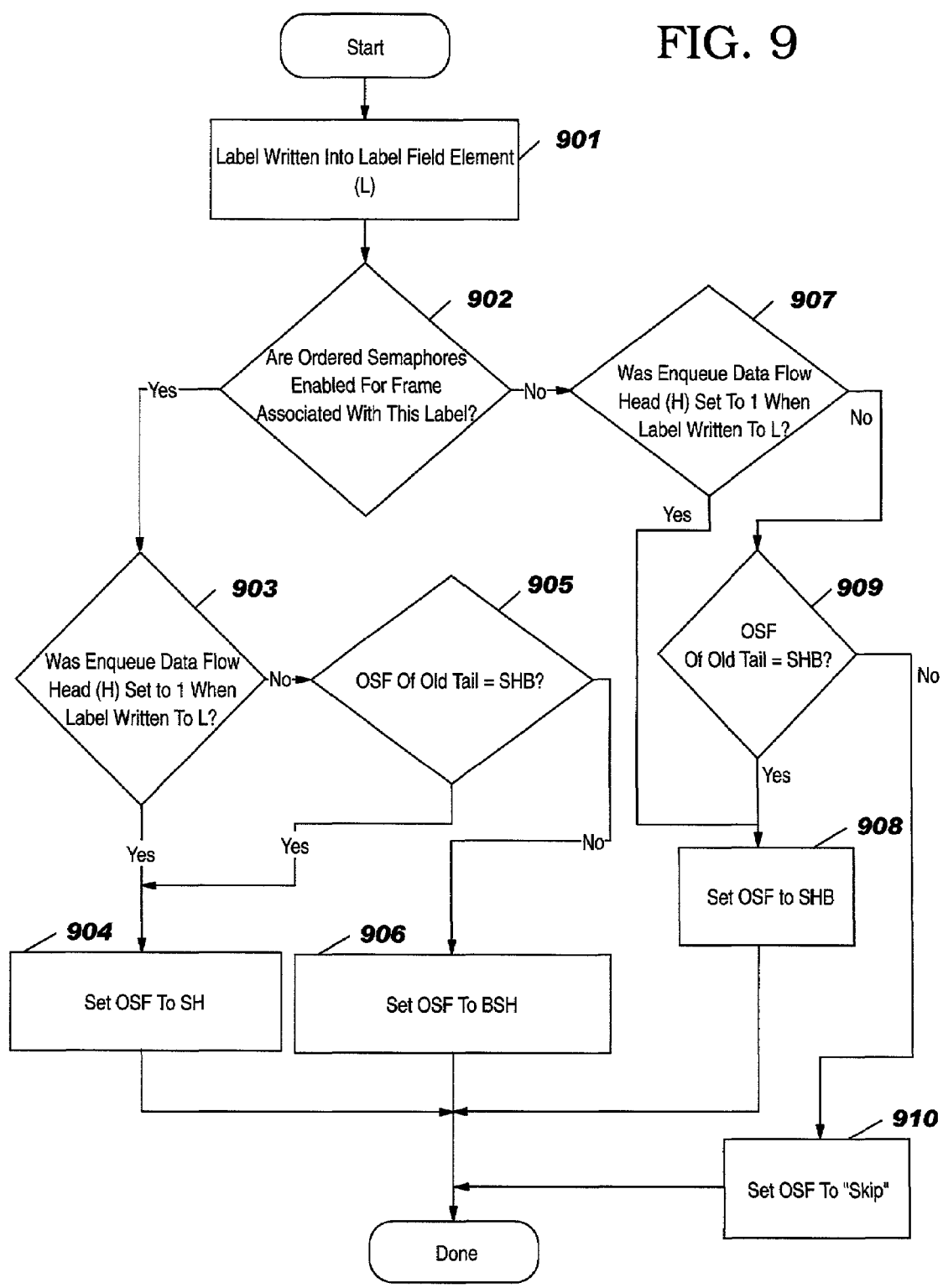

The flow diagram of FIG. 9 defines the logic for initializing an ordered semaphore field OSF. When a label is written into the label field (801), update of the OSF starts (901). The logic determines if ordered semaphores are enabled for the frame associated with the label 902. The label is checked 903 to determine if the enqueue data flow head was set to one when the label was written. If it was the associated OSF is set to the head state SH 904 and the operation is complete. If it was not set to one and the OSF of the old tail is SHB 905, the OSF of the label is set to SH 904. If 905 is negative, the OSF of the label is set to BSH 906.

If block 902 is negative, block 907 determines if the enqueue data flow head was set to one when the label was written. If it was, the OSF is set to SHB 908. If block 907 is negative, block 909 determines if the OSF of the old tail was SHB and sets the OSF of the label to SHB 908. If block 909 is negative the label OSF is set to Skip 910.

Figure 10:
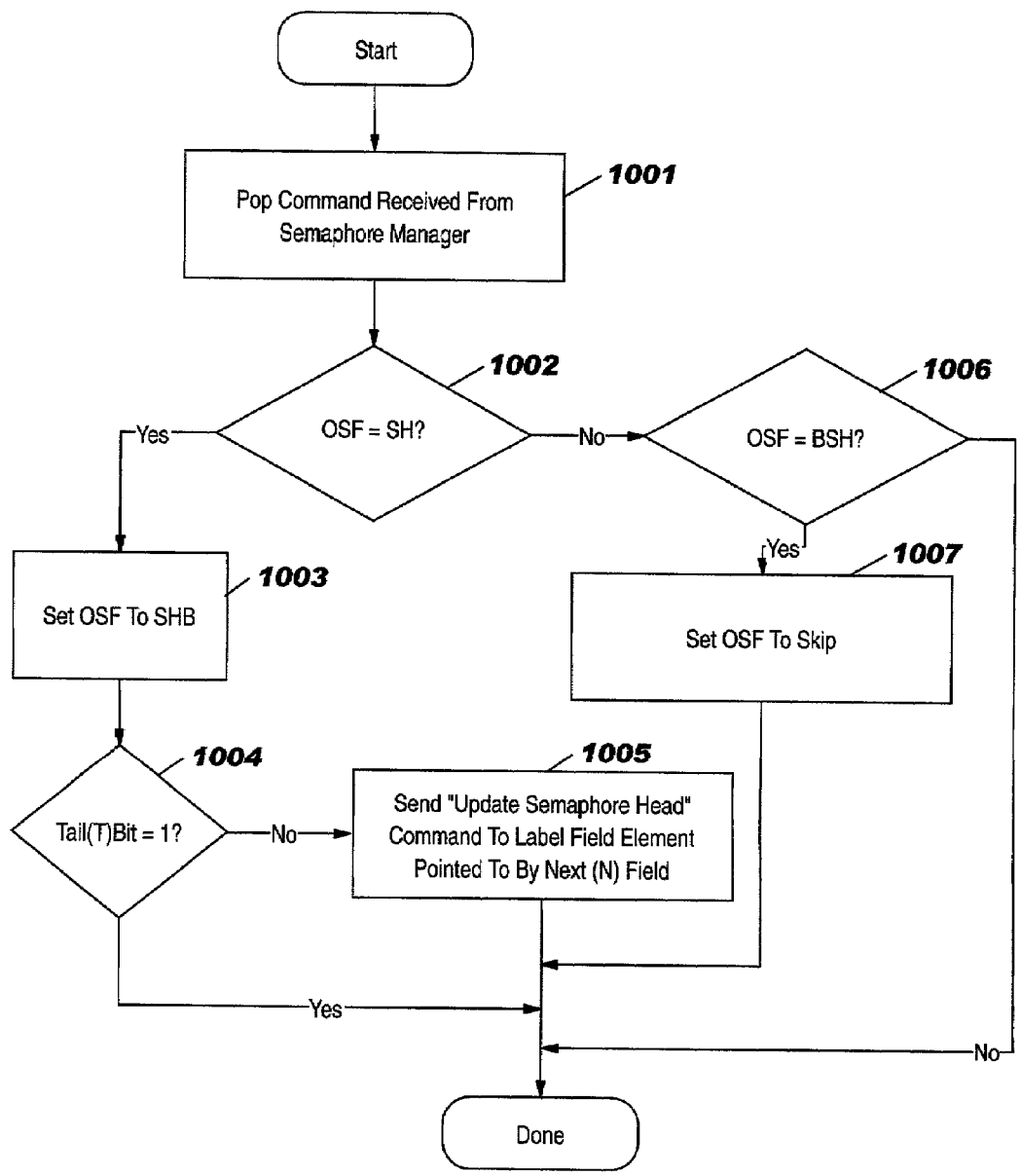

When a Pop command (FIG. 7, 703 or FIG. 4B, 409) is received at the interface 26 FIG. 10 at block 1001, the OSF for the thread is checked 1002 to determine if the OSF was set to SH. If it is set to SH, the field is changed to SHB state 1003. The tail bit is checked 1004. If the tail bit is one the process ends. If the tail bit is not one, an update semaphore head command is sent to the next element or thread in the linked list 1005 and the process ends. If block 1002 is negative, block 1006 checks the OSF to determine if it is set to the BSH. If it is, the OSF of the element or thread is set to the Skip state 1007 and the process ends. When block 1006 is negative the process ends and no change to the OSF is made.

Figure 11:
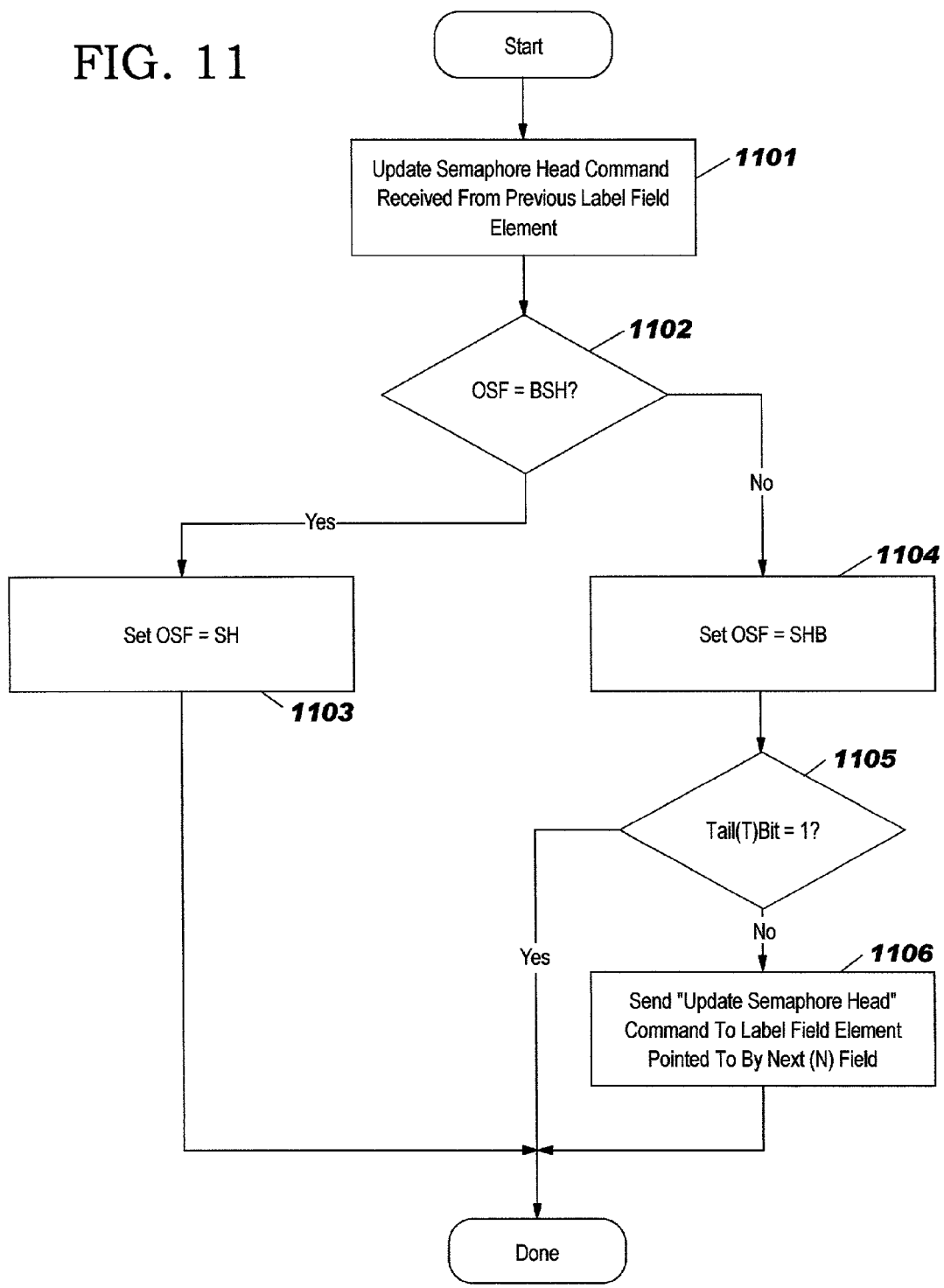

In FIG. 11, in response to the receipt of an update semaphore head command (FIG. 10, 1005 or FIG. 11, 1106) from a previous label or thread 1101, the logic 1102 examines the OSF of the current label. If the field is BSH the field is changed to SH 1103. If it is not BSH, it is set to SHB state 1104. The tail bit is checked 1105. If the tail bit is set the process ends. If the tail bit is not set an update semaphore head command is sent to the label or thread identified in the pointer 1106 and the process ends.

Figure 12:
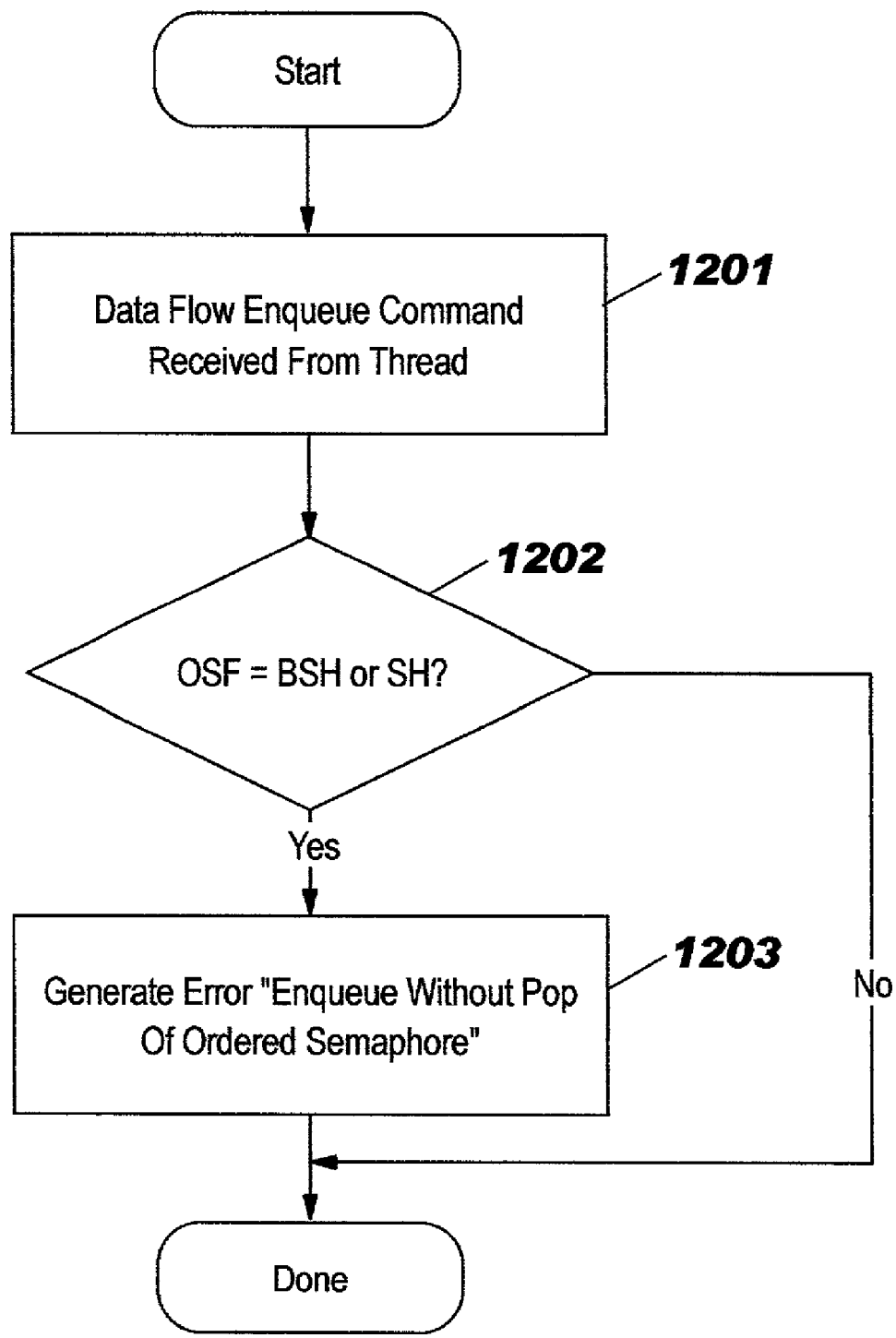

When the completion unit receives a data flow enqueue command from a thread FIG. 12, 1201 the OSF is examined 1202. If it is neither SH or BSH the process ends. If the field is SH or BSH, the semaphore manager generates an enqueue without Pop of ordered semaphore error message 1203. This indicates to the software that a thread was enabled to use ordered semaphores but did not.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

We claim:

1. In an application system including, one or more shared resources each controlled by a unique semaphore, a plurality of processors adapted to perform similar tasks on assigned segments of a continuous data flow in the data flow sequence, using one or more shared resources controlled by semaphores, a linked list of processor labels each identifying a processor and defining the order in which the processed data is to be assembled, each said label including, a data flow ID, a data flow head field, a data flow tail field and a pointer field pointing to the next label in the linked list, an ordered semaphore management subsystem comprising:

first logic circuit responsive to the creation of a label included in the linked list for generating and encoding one of a plurality of predetermined states in an ordered semaphore field (OSF) corresponding to the created label;

second logic circuit responsive to an ordered semaphore request from a processor for examining the encoded OSF corresponding to the processor's label and granting the semaphore request when the field is in a first predetermined state; and, third logic circuit responsive to a change in the status of a processor for updating the ordered semaphore field corresponding to the label associated with the processor and for updating the ordered semaphore field corresponding to the label identified by the pointer in the label of the processor whose status changed.

2. In an application system including, one or more shared resources each controlled by a unique semaphore, a plurality processors adapted to perform similar tasks on assigned segments of a continuous data flow in the data flow sequence, using one or more shared resources controlled by semaphores, a linked list of processor labels each identifying a processor and defining the order in which the processed data is to be assembled, each said label including, a data flow ID, a data flow head field, a data flow tail field and a pointer field pointing to the next label in the linked list, an ordered semaphore management subsystem comprising:

first logic circuit responsive to the creation of a label including in the linked list for generating and encoding one of a plurality of predetermined states in an ordered semaphore field (OSF) corresponding to the created label;

second logic circuit responsive to an ordered semaphore request from a processor for examining the encoded OSF corresponding to the processor's label and granting the semaphore request when the field is in a first predetermined state; and third logic circuit responsive to a change in the status of a processor for updating the ordered semaphore field corresponding to the label associated with the processor and for updating the ordered semaphore field corresponding to the label identified by the pointer in the label of the processor whose status changed wherein the plurality of states in the OSF include;

semaphore head (SH) state, behind semaphore head (BSH) state, semaphore head behind (SHB) state and, skip (Skip) state.

3. The ordered semaphore management subsystem set forth in claim 2 in which the first logic circuit encodes the head of ordered semaphores SH state when;

ordered semaphores are enabled for this label and data flow, and the head field of the data flow of the label is set to head of data flow, or the OSF of the old tail field of the data flow is in the SHB state.

4. The ordered semaphore management subsystem set forth in claim 2 in which the first logic circuit encodes the behind semaphore head (BSH) state when;

ordered semaphores are enabled for this label and data flow, and the head field of the data flow of the label is not set to head of data flow, and when the ordered semaphore field of the old tail field of the data flow is not in the SHB state.

5. The ordered semaphore management subsystem set forth in claim 2 in which the first logic circuit encodes semaphore head behind (SHB) state when;

ordered semaphores are not enabled for this label and data flow, and the head field of the data flow of the label is set to head of data flow, or the OSF of the old tail field of the data flow is in the SHB state.

6. The ordered semaphore management subsystem set forth in claim 2 in which the first logic circuit encodes the Skip state when;

ordered semaphores are not enabled for this label and data flow, and the head field of the data flow of the label is not set to head of data flow, and the ordered semaphore field of the old tail field of the data flow is not in the SHB state.

7. The ordered semaphore management subsystem set forth in claim 2 in which the second logic circuit grants the semaphore request when the OSF is SH.

8. The ordered semaphore management subsystem set forth in claim 2 in which the third logic circuit in response to a change in status indicating that a processor no longer requires a semaphore:

changes the status of the OSF associated with the processor to SHB and terminates the operation if the processor is identified as the tail in the associated link list; and, if the processor is not identified as the tail in said linked list, the OSF associated with the processor identified by the pointer field is changed to SH if it is BSH and terminates the operation and if it is not BSH the above process is continued until the pointed to processor is identified as the tail of the linked list.

9. In an application system including, one or more shared resources each controlled by a unique semaphore, a plurality of processors adapted to perform similar tasks on assigned segments of a continuous data flow in the data flow sequence, using one or more shared resources controlled by semaphores, a linked list of processor labels each identifying a processor and defining the order in which the processed data is to be assembled, each said label including, a data flow ID, a data flow head field, a data flow tail field and a pointer field pointing to the next label in the linked list, an ordered semaphore management subsystem comprising:

first logic circuit responsive to the creation of a label included in the linked list for generating and encoding one of a plurality of predetermined states in an ordered semaphore field corresponding to the created label, said states including;

a semaphore head (SH) state, a behind semaphore head (BSH) state, a semaphore head behind (SHB) state and, a skip (Skip) state, second logic circuit responsive to a semaphore request from a processors for examining the encoded ordered semaphore field corresponding to the processor's label and granting the semaphore request when the field is in the SH state; and, third logic circuit responsive to a change in the status of a processor for updating the ordered semaphore field corresponding to the label associated with the processor and updates the ordered semaphore field corresponding to the label identified by the pointer in the label of the processor whose status changed.

10. The ordered semaphore management subsystem set forth in claim 9 in which:

the first logic circuit selects the SH state when ordered semaphores are enabled for this label and data flow, and the head field of the data flow of the label is set to head of data flow, or the ordered semaphore field of the old tail field of the data flow is in the SHB state;

the (BSH) state is selected by the first logic circuit when ordered semaphores are enabled for this label and data flow, and the head field of the data flow of the label is not set to head of data flow, and when the ordered semaphore field of the old tail field of the data flow is not in the SHB state;

the semaphore head behind (SHB) field is selected by the first logic circuit when ordered semaphores are not enabled for this label and data flow and the head field of the data flow of the label is set to head of data flow, or the OSF of the old tail is SHB; and, the Skip state is selected by the first logic circuit when ordered semaphores are not enabled for this label and data flow, and the head field of the data flow of the label is not set to head of data flow, and the ordered semaphore field of the old tail field of the data flow is not in the SHB state.

11. The ordered semaphore management subsystem set forth in claim 9 in which the third logic circuit in response to a change in status indicating that a processor no longer requires a semaphore changes;

the status of the OSF associated with the processor to SHB and terminates the operation if the processor is identified as the tail in the associated link list; and, if the processor is not identified as the tail in said link list, the OSF associated with the processor identified by the pointer field is changed to SH if it is BSH and terminates the operation and if it is not BSH the above process is continued until the pointed to processor is identified as the tail of the link list.

12. In an application system including, one or more shared resources each controlled by a unique semaphore, a plurality of processors adapted to perform similar tasks on assigned segments of a continuous data flow in the data flow sequence, using one or more shared resources controlled by semaphores, a linked list of processor labels each identifying a processor and defining the order in which the processed data is to be assembled, each said label including, a data flow ID, a data flow head field, a data flow tail field and a pointer field pointing to the next label in the linked list, a method for managing ordered semaphores comprising the steps:

responsive to the creation of a label included in the linked list generating and encoding one of a plurality of predetermined states in an ordered semaphore field (OSF) corresponding to the created label;

responsive to a semaphore request from a processors examining the encoded OSF corresponding to the processor's label and granting the semaphore request when the field is in a first predetermined state; and, responsive to a change in the status of a processor updating the ordered semaphore field corresponding to the label associated with the processor and updating the ordered semaphore field corresponding to the label identified by the pointer in the label of the processor whose status changed.

13. In an application system including, one or more shared resources each controlled by a unique semaphore, a plurality of processors adapted to perform similar tasks on assigned segments of a continuous data flow in the data flow sequence, using one or more shared resources controlled by semaphores, a linked list of processor labels each identifying a processor and defining the order in which the processed data is to be assembled, each said label including, a data flow ID, a data flow head field, a data flow tail field and a pointer field pointing to the next label in the linked list, a method for managing ordered semaphores comprising the steps:

responsive to the creation of a label included in the linked list generating and encoding one of a plurality of predetermined states in an ordered semaphore field (OSF) corresponding to the created label;

responsive to a semaphore request from a processors examining the encoded OSF corresponding to the processor's label and granting the semaphore request when the field is in a first predetermined state; and, responsive to a change in the status of a processor updating the ordered semaphore field corresponding to the label associated with the processor and updating the ordered semaphore field corresponding to the label identified by the pointer in the label of the processor whose status changed wherein the plurality of states in the OSF include;

semaphore head (SH) state, behind semaphore head (BSH) state, semaphore head behind (SHB) state and, skip (Skip) state.

14. The ordered semaphore management method set forth in claim 13 in which the OSF is encoded as the head of ordered semaphores SH when;

ordered semaphores are enabled for this label and data flow, and the head field of the data flow of the label is set to head of data flow, or the ordered semaphore field of the old tail field of the data flow is in the SHB state.

15. The ordered semaphore management method set forth in claim 13 in which the OSF is encoded as the behind semaphore head (BSH) state when;

ordered semaphores are enabled for this label and data flow, and the head field of the data flow of the label is not set to head of data flow, and when the ordered semaphore field of the old tail field of the data flow is not in the SHB state.

16. The ordered semaphore management method set forth in claim 13 in which the OSF is encoded as the semaphore head behind (SHB) state when;
ordered semaphores are not enabled for this label and data flow, and the head field of the data flow of the label is set to head of data flow, or the OSF of the old tail field of the data flow is in the SHB state.

17. The ordered semaphore management method set forth in claim 13 in which the OSF is encoded as the Skip state when;
ordered semaphores are not enabled for this label and data flow, and the head field of the data flow of the label is not set to head of data flow, and the ordered semaphore field of the old tail field of the data flow is not in the SHB state.

18. The ordered semaphore management subsystem set forth in claim 13 in which the semaphore request is granted when the OSF is SH.

19. The ordered semaphore management method set forth in claim 13 in which in response to a change in status indicating that a processor no longer requires a semaphore;
the status of the OSF associated with the processor is changed to SHB and the operation terminates if the processor is identified as the tail in the associated linked list; and,
if the processor is not identified as the tail in said linked list, the OSF associated with the processor identified by the pointer field is changed to SH if it is BSH and terminates the operation and if it is not BSH the above process is continued until the pointed to processor is identified as the tail of the link list.

20. In an application system including, one or more shared resources each controlled by a unique semaphore, a plurality of processors adapted to perform similar tasks on assigned segments of a continuous data flow in the data flow sequence, using one or more shared resources controlled by semaphores, a linked list of processor labels each identifying a processor and defining the order in which the processed data is to be assembled, each said label including, a data flow ID, a data flow head field, a data flow tail field and a pointer field pointing to the next label in the linked list, a method for managing ordered semaphores comprising the steps:
responsive to the creation of a label included in the linked list generating and encoding one of a plurality of predetermined states in an ordered semaphore field corresponding to the created label, said states including;
a semaphore head (SH) state,
a behind semaphore head (BSH) state,
a semaphore head behind (SHB) state and,
a skip (Skip) state,
responsive to a semaphore request from a processors examining the encoded ordered semaphore field corresponding to the processor's label and granting the semaphore request when the field is in the SH state; and,
responsive to a change in the status of a processor updating the ordered semaphore field corresponding to the label associated with the processor and updating the ordered semaphore field corresponding to the label identified by the pointer in the label of the processor whose status changed.

21. The ordered semaphore management method set forth in claim 20 in which:
the SH state is selected when ordered semaphores are enabled for this label and data flow, and the head field of the data flow of the label is set to head of data flow, or the ordered semaphore field of the old tail field of the data flow is in the SHB state;
the (BSH) state is selected when ordered semaphores are enabled for this label and data flow, and the head field of the data flow of the label is not set to head of data flow, and when the ordered semaphore field of the old tail field of the data flow is not in the SHB state;
the semaphore head behind (SHB) field is selected when ordered semaphores are not enabled for this label and data flow, and the head field of the data flow of the label is set to head of data flow; and,
the Skip state is selected when ordered semaphores are not enabled for this label and data flow, and the head field of the data flow of the label is not set to head of data flow, and the ordered semaphore field of the old tail field of the data flow is not in the SHB state.

22. The ordered semaphore management method set forth in claim 20 in which in response to a change in status indicating that a processor no longer requires a semaphore;
the status of the OSF associated with the processor is changed to SHB and the operation terminates if the processor is identified as the tail in the associated link list; and,
if the processor is not identified as the tail in said link list, the OSF associated with the processor identified by the pointer field is changed to SH if it is BSH and if it is not BSH the above process is continued until the pointed to processor is identified as the tail of the link list.

23. A semaphore system comprising:
at least one label including at least an ordered semaphore field (OSF);
first logic circuit responsive to the creation of said label for generating and encoding one of a plurality of predetermined states in said ordered semaphore field (OSF);
second logic circuit responsive to an ordered semaphore request from a processor for examining the encoded OSF corresponding to the processor's label and granting the semaphore request when the field is in a first predetermined state; and,
third logic circuit responsive to a change in the status of a processor for updating the ordered semaphore field corresponding to the label associated with the processor and for updating the ordered semaphore field corresponding to the label identified by the pointer in the label of the processor whose status changed.

* * * * *